US009320192B2

(12) United States Patent
Steffen et al.

(10) Patent No.: US 9,320,192 B2
(45) Date of Patent: Apr. 26, 2016

(54) SYNCHRONIZATION OF A TWIN ROW PLANTING SYSTEM

(71) Applicant: DICKEY-john Corporation, Auburn, IL (US)

(72) Inventors: Ronald W. Steffen, Springfield, IL (US); David Kuhnel, Johnstown, CO (US)

(73) Assignee: DICKEY-john Corporation, Auburn, IL (US)

(*) Notice: Subject to any disclaimer, the term of this patent is extended or adjusted under 35 U.S.C. 154(b) by 0 days.

(21) Appl. No.: 14/536,832

(22) Filed: Nov. 10, 2014

(65) Prior Publication Data

US 2015/0134210 A1    May 14, 2015

Related U.S. Application Data

(60) Provisional application No. 61/902,880, filed on Nov. 12, 2013.

(51) Int. Cl.
| | | |
|---|---|---|
| A01C 7/10 | (2006.01) | |
| A01C 19/00 | (2006.01) | |
| A01C 21/00 | (2006.01) | |
| A01C 19/02 | (2006.01) | |

(52) U.S. Cl.
CPC ............ *A01C 7/102* (2013.01); *A01C 7/107* (2013.01); *A01C 19/02* (2013.01); *A01C 21/005* (2013.01)

(58) Field of Classification Search
CPC ........ A01C 7/102; A01C 7/107; A01C 19/02; A01C 21/005
See application file for complete search history.

(56) References Cited

U.S. PATENT DOCUMENTS

| | | | |
|---|---|---|---|
| 3,912,121 A | * | 10/1975 | Steffen ................ A01C 7/10 |
| | | | 111/904 |
| 4,085,862 A | | 4/1978 | Steffen |
| 4,225,930 A | | 9/1980 | Steffen |
| 4,473,016 A | | 9/1984 | Gust |
| 5,598,794 A | | 2/1997 | Harms et al. |
| 5,635,911 A | | 6/1997 | Landers et al. |
| 6,199,000 B1 | | 3/2001 | Keller et al. |
| 6,386,128 B1 | | 5/2002 | Svoboda et al. |
| 6,516,271 B2 | | 2/2003 | Upadhyaya et al. |
| 6,520,100 B1 | | 2/2003 | Spooner, Sr. et al. |
| 7,377,221 B1 | | 5/2008 | Brockmeier |
| 7,726,251 B1 | | 6/2010 | Peterson et al. |
| 7,775,167 B2 | | 8/2010 | Stehling et al. |
| 8,074,586 B2 | | 12/2011 | Garner et al. |
| 2012/0265410 A1 | | 10/2012 | Graham et al. |
| 2014/0076216 A1 | | 3/2014 | Kormann et al. |

FOREIGN PATENT DOCUMENTS

| | | |
|---|---|---|
| EP | 0132521 | 2/1985 |
| EP | 0145237 | 6/1985 |
| EP | 0085049 | 9/1985 |

(Continued)

*Primary Examiner* — Rodney Butler
(74) *Attorney, Agent, or Firm* — Kagan Binder, PLLC (57) ABSTRACT

There is disclosed a single and twin and multiple row planting system configured to be adapted to a planter including a motor drive seed dispenser that is controlled by a planting controller that deposits seeds with a predetermined seed spacing that accommodates differing individual planter row speeds and terrain. In particular, a distance-based seed tagging system and method are used to achieve the desired seed spacing and seed stagger configurations.

20 Claims, 7 Drawing Sheets

(56) References Cited

FOREIGN PATENT DOCUMENTS

| | | |
|---|---|---|
| EP | 0160370 | 11/1985 |
| EP | 0425934 | 5/1991 |
| EP | 0592995 | 4/1994 |
| EP | 0598311 | 5/1994 |
| EP | 0650660 | 5/1995 |
| EP | 0769896 | 5/1997 |
| EP | 0997064 | 5/2000 |
| EP | 0998841 | 5/2000 |
| EP | 1023823 | 8/2000 |
| EP | 1084603 | 3/2001 |
| EP | 1415523 | 5/2004 |
| EP | 1579754 | 9/2005 |
| EP | 1637026 | 3/2006 |
| EP | 1920647 | 5/2008 |
| EP | 2213153 | 8/2010 |
| EP | 2227932 | 9/2010 |
| EP | 2401902 | 1/2012 |
| EP | 2517545 | 10/2012 |
| FR | 2396498 | 2/1979 |
| FR | 2457628 | 12/1980 |
| FR | 2471125 | 6/1981 |
| GB | 623145 | 5/1949 |
| WO | 94/24843 | 11/1994 |
| WO | 95/02318 | 1/1995 |
| WO | 99/39562 | 8/1999 |
| WO | 2006/092133 | 9/2006 |
| WO | 2008/024760 | 2/2008 |
| WO | 2013/103937 | 7/2013 |

* cited by examiner

SYNCHRONIZATION OF A TWIN ROW PLANTING SYSTEM

CROSS-REFERENCE TO RELATED APPLICATIONS

This application claims the benefit of U.S. Provisional Patent Application No. 61/902,880, filed Nov. 12, 2013 and titled "SYNCHRONIZATION OF A TWIN ROW PLANTING SYSTEM" which application is incorporated herein by reference in its entirety.

BACKGROUND

This invention relates generally to seed planting apparatus, and more particularly to a controlled planting system which automatically controls and maintains a preselected density of population of seeds delivered to furrows formed in a field and maintains a spatial relationship between seeds in various seeding configurations.

Present day farming techniques include, among other things, the automatic planting and harvesting of crops. The planting of seeds to establish a crop field is often accomplished by driving a tractor, or other suitable vehicle, while pulling a seed dispensing device, preferably several such devices extending transversely of the direction of travel of the tractor, while seeds are continuously dispensed into a corresponding number of furrows formed in the field. This automatic seed dispensing apparatus is generally driven by a drive wheel which is part of the planter. In such prior art regarding automatic seed dispensing devices, the rate at which seeds are dispensed can be altered by manually setting the drive coupled to the seed dispenser.

In order to obtain the maximum yield per acre, a farmer must accurately control the number of seeds planted per acre. To accomplish this in the past, the farmer would incorporate a counter device at the seed dispenser of the planter and count the number of seeds being dispensed. During this period of counting, the farmer would either manually or automatically incorporate means to calculate the distance travelled so he could determine the area covered. After travelling a predetermined distance during which time seeds are planted, the farmer can then calculate the density of population of seeds for the small area. If the density of population is in accordance with his prescribed yield for that particular field, the farmer may continue his planting operation without change. However, if adjustment is to be made to the planting equipment the farmer must make it at this time and take a second sampling of the number of seeds dispensed during travel over another prescribed area. While being somewhat of an automatic system for the planting of seeds this arrangement has the disadvantage in requiring substantial amounts of time for setup and checking before continuous planting operation can commence. Furthermore, the accuracy of the population density of the seeds planted in this manner is at best only a close approximation because of the possibility of very closely spaced seeds being dispensed in a manner to produce coincident seed count pulses which would register as a single seed count.

With reference to U.S. Pat. No. 7,726,251, the above described inventive concepts differ significantly from that taught in this patent. In particular, the '251 patent appears to operate in the time realm in performing its comparisons. It mentions that row dispensers could be displaced for-aft locations but does not explain how this is to be handled using the time based comparison method. With respect to EP 1,415,523 there is disclosed a seed drill oriented seed planting system that appears to use an external positioning system to deposit seeds in a furrow. In practice, this approach fails to take into account the speed of the tractor which can increase or decrease seed spacing even though you may know where you want to release the seed but would not know the final location of the deposited.

The aforementioned planting systems and ability to keep track of the seeds planted in a field are further complicated where the farmer intends to increase the density of seeds to be planted per acre and the conditions of the terrain can change. Also, the adjustment of the planter to control the spatial relationship between two adjacent (or twin rows) planting units adds an additional complication.

SUMMARY

The various embodiments of the invention disclosed herein relates generally to seed planting apparatus, and more particularly to a controlled planting system which automatically controls and maintains a preselected density of population and spacing of seeds delivered to furrows. In a related embodiment, the system is configurable for a twin row planting arrangement.

In one example embodiment of our invention, we provide a row planting system that would be integrated into a single or twin or multiple row planting unit on a row-crop planter that includes a seed dispensing apparatus that is driven by an electric motor, directly or controlling a variable ratio transmission, both of which are controlled by a planting system configured to control the deposition speed of the seed dispensing apparatus to achieve a predetermined seed population by controlling seed spacing.

In another example embodiment, a planter assembly and system is provided that includes a planter controller having a variable speed drive control for individual planter row meters which will allow for independent population rates per row, or groups of rows, and provide a means to shut a row off when passing through previously seeded area (auto section control). This will require that the variable speed drive (stepper or electric motor) be integrated into the design of the actual row/metering unit. In yet another example embodiment, a method is provided for controlling seed spacing in a twin row (or two adjacent rows) configuration where the position of the seed in the ground from dispenser one is staggered from the position of the seed from dispenser two. This is accomplished by noting the relative spatial position in the direction of travel of each seed dispensed from the two dispensers. This allows the position of every seed in the ground to be known relative to each other. The method also includes controlling the seed dispensing mechanism to correct spacing where the seeds in one furrow are not perfectly staggered with seeds in the adjacent furrow.

In another example embodiment, a seed dispensing system is provided that includes at least a first and a second row unit adapted to dispense seeds and arranged in a staggered configuration, with each row unit including a seed dispensing device adapted to provide a dispensing action for a plurality of seeds; a drive assembly configured to drive the seed dispensing device; and a sensor adapted to sense at least the passage of a seed and generate a signal corresponding to the seed passage. The seed dispensing system further includes an individual row controller operably coupled to the drive assembly of each row unit and configured to receive the seed sensor signals and designate distance tags for each passing seed related to a seed position in a furrow beneath each of the first and second row units, the individual row controller further configured to store seed sensor signals from each row unit until a first row unit sample size and a second row unit sample size is reached. The controller is further configured to combine the first and second sample size to generate a third sample size that simulates a single row seed spacing configuration and to determine whether the seed spacing is at a desired level or optimized. The row controller is further configured to alter the dispensing action of the seed dispensing device of the first or second row unit to establish the desired or optimum seed spacing in terms of singulation of the seed or any other mathematical (or arithmetic) evaluation of seed spacing. In this example embodiment, the controller is reconfigurable for seed spacing as a function of the number of seeds per revolution of a dispensing disc and the number of degrees of a disc drive shaft rotation to arrive at a number of degree drive shaft rotation between seed drops of two seed dispensers or row units. Further in this example embodiment, the controller achieves a desired staggered seed spacing configuration between the first and second row unit by synchronizing the angular positions of the two seed dispensing discs in the selected two rows.

In another example embodiment, a seed planting system is provided that includes a plurality of row units adapted to dispense seeds, with each row unit including a seed dispensing device adapted to provide a dispensing action for a plurality of seeds; a drive assembly configured to drive the seed dispensing device; a sensor adapted to sense at least the passage of a seed and generate a signal corresponding to the seed passage. The seed planting device also includes a row controller adapted to control two adjacent row units of the plurality of row units and configured to communicate with the drive assembly of each the adjacent row units. The controller further configured to receive the seed sensor signals from each row unit and assign or designate distance tags for each passing seed related to a seed position in a furrow beneath each row unit. The controller is further configured to store seed sensor signals from each row unit until a row unit sample size for each row unit is reached, wherein the controller is configured to combine the sample sizes of two adjacent row units to generate another (or a single row sample size) sample size that simulates a single row seed spacing configuration (between the two adjacent rows) and to determine whether the seed spacing is at a desired level or optimized. In a related embodiment, the controller is configured to alter the dispensing action of the seed dispensing device of either of two adjacent row units of the plurality of row units to establish the desired or optimum seed spacing in terms of singulation of the seed or any other mathematical or arithmetic (or algorithm) evaluation of seed spacing, wherein altering the dispensing action of the seed dispensing device of one or more row units includes increasing the speed of a seed dispensing drive assembly for a given time period to achieve the desired synchronization. In this example embodiment, the row controller is reconfigurable for seed spacing as a function of the number of seeds per revolution of a dispensing disc and the number of degrees of a disc drive shaft rotation to arrive at a number of degree drive shaft rotation between seed drops of two seed dispensers or row units. In addition, in this example embodiment, the controller achieves a desired staggered seed spacing configuration between the two adjacent row units by synchronizing the angular positions of the two seed dispensing discs in the selected two rows.

In yet another example embodiment, a method of depositing seeds with a planter system is provided having multiple row units, with each row unit having a seed dispensing device, the multiple row units are operated such that seeds are dispensed from the seed dispensing device and a seed passage is sensed for at least a first row unit and a second row unit and then generating a seed signal for each sensed seed of each row unit. Distance-based tags or stamps are assigned or designated for each seed signal (and seed) which relate to a seed position in a furrow beneath each of the first and second row units and then the seed sensor signals from each row unit are stored until a first row unit sample size and a second row unit sample size is reached. The first and second sample sizes are then combined to generate a third sample size that simulates a single row seed spacing configuration and then it is determined whether the seed spacing is at a desired level. In a related embodiment, the method includes the step of altering the dispensing action of the seed dispensing device of the first or second row unit to establish the desired or optimum seed spacing in terms of singulation of the seed or other mathematical (or arithmetic) evaluation of seed spacing, wherein the step of altering the dispensing action of the seed dispensing device of one or more row units includes increasing the speed of a seed dispensing drive assembly for a given time period to achieve the desired synchronization. In this example embodiment, the method further includes the step of reconfiguring the seed spacing as a function of a number of seeds per revolution of a dispensing disc and a number of degrees of a disc drive shaft rotation to arrive at a number of degree drive shaft rotation between seed drops of two seed dispensers or row units. The method also includes the step of achieving a staggered seed spacing configuration between the first and second row unit by synchronizing the angular positions of the two seed dispensing discs in the selected two rows. The method also includes the step of providing a ground distance-measuring sensor input signal so as to establish the optimum seed spacing.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation.

Examples of specific implementations and applications are provided primarily for illustrative purposes.

Figure 1:
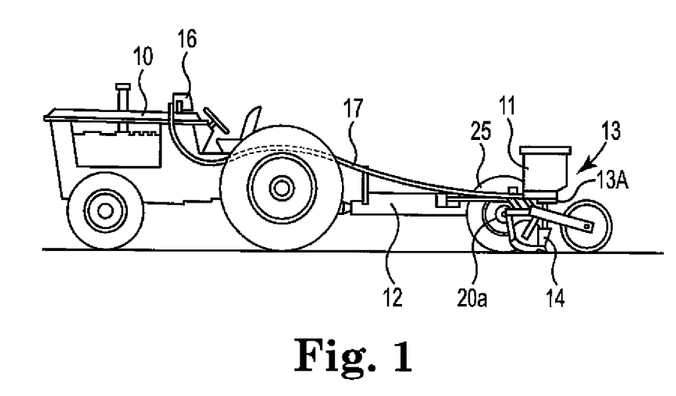
FIG. 1 Illustrates a typical planter assembly being pulled by a tractor.

Referring now to FIG. 1, the basic components of a controlled seed deposition apparatus of the invention are illustrated, which includes a tractor 10, or any other suitable vehicle, to transport a material (grain/seed or chemicals or fertilizers) hopper 11, or a plurality of such hoppers (or planters) on a planter boom extending transversely to the direction of travel of the tractor, over a field to be planted or treated. The connection made between the tractor 10 and hopper 11 can be by any suitable arrangement, here being illustrated by means of a hitch 12 which may include a rotary shaft and hydraulic pump arrangement for operating hydraulically drive motors associated with the dispensing portion of the hopper 11. In a related embodiment, the drive motor is an electric motor. In yet another related embodiment, the teachings herein are applicable to air seeders and seed drill configurations for planting.

Positioned at the lower portion of the hopper 11 is a seed dispensing system 13 that include a seed dispenser or mechanism 13A which directs the seeds to be planted downwardly into furrows formed in the field. The seed dispensing mechanism 13A can be operated by a variable speed drive means such as a variable speed hydraulic or electric motor or the like. Immediately beneath the seed dispenser 13A is a seed sensor 14 (optical, microwave or infrared or the like) which produces an electrical signal, preferably in the form of a pulse signal, for each seed actually passing therethrough en route to the furrow. Therefore, an electrical signal is generated in response to seeds actually dispensed. Mounted on the tractor 10, in any convenient location for manipulation and observation by the tractor operator, is a control and monitor row unit 16 which is operatively coupled to the seed dispenser and seed sensing devices through a control cable 17. However, it will be understood that other means (wirelessly through RF or Bluetooth or laser light coupling or other forms of wireless communication) for coupling the monitor and seed dispensing and sensing equipment may be incorporated.

In operation, the farmer need merely start the tractor, set the desired information into the row controller unit 16 (or a master controller) as to the density (or other parameter) of population of seeds desired, and then pull the hopper or hoppers behind the tractor at any desired speed. The rate of movement of the tractor over the ground is detected by a distance-measuring device which produces pulse signals which are delivered to the row control unit 16 for comparison with control signals generated by the seed sensor 14 (in a related embodiment, multiple seed sensors are used). These two signals are then used to control the rate of operation of the seed dispensing system 13 thereby automatically maintaining a desired density of seed population over the field being planted regardless of variations in planter efficiency. Should the number of seeds being planted vary as a result of a pulse frequency input from a GPS received by the seed dispensing unit 13A, or as a result of a malfunction of this seed dispensing unit, a corresponding control signal will be generated to vary the operation of the seed dispenser so that a constant density of seed population is maintained or to give a warning signal to the operator that a malfunction has occurred or, such signal is provided to a control system so as to modify the seed dispensing device in the amount of seeds being deposited. A furrow opener 25 is also provided in this planter configuration.

Figure 2A:
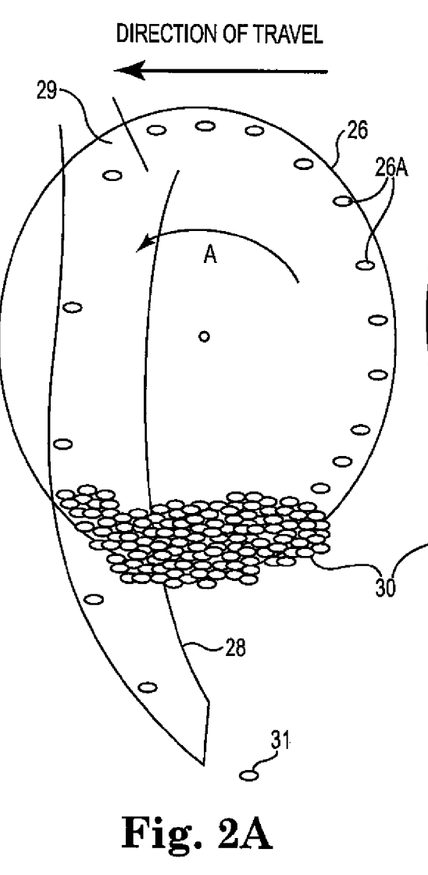
FIGS. 2A-2B illustrate a side view and a rear view, respectively, of a seed dispenser device.
Figure 2B:
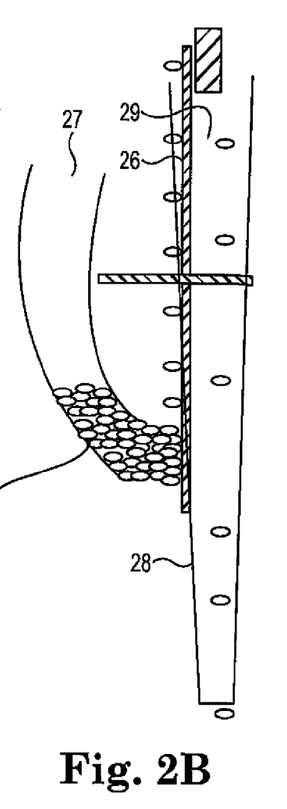

Referring now to FIGS. 2A-2B there is provided a side view and a rear view of one possible seed dispensing mechanism, which in this example is a vacuum operated seed dispenser 26 (other seed dispensers can also be used). Not shown is a vacuum unit that maintains a vacuum on the side of the rotating seed disc 26 (rotating in the direction of arrow A) that is away from the seed source. In this example embodiment, seed 30 is sourced via a conveyor chute 27. When disc 26 rotates through a pile of seeds 30 at the bottom of a disc assembly housing, holes 26A in disc 26 carry the seeds upward one seed per hole due to the vacuum on the opposite side of the disc. When the seed gets to the release point 29, the vacuum is blocked and a seed 31 falls into a trough that drops it into a seed chute or tube 28. This chute conveys the seed via gravity to the furrow. A seed sensor can be located at any place along the seed chute. Not shown is a motor (electric or hydraulic or pneumatic) that is operatively coupled to seed disc 26 and is configured to control and vary the rotational speed of seed disc 26 by controlling the shaft rotation.

In this example embodiment, seed disc 26 is rotated at a speed that will dispense the desired amount of seed kernels given the predicted travel distance of the planter and the desired population. Seed disc 26 can be driven via a common drive component for multiple seed dispensers or it can be driven individually for precise control of each seed dispenser with compensation for the exact distance traveled of the individual row. The individual row predicted travel distance compensation is important to maintain precise population in curved furrows in the field.

Figure 3:
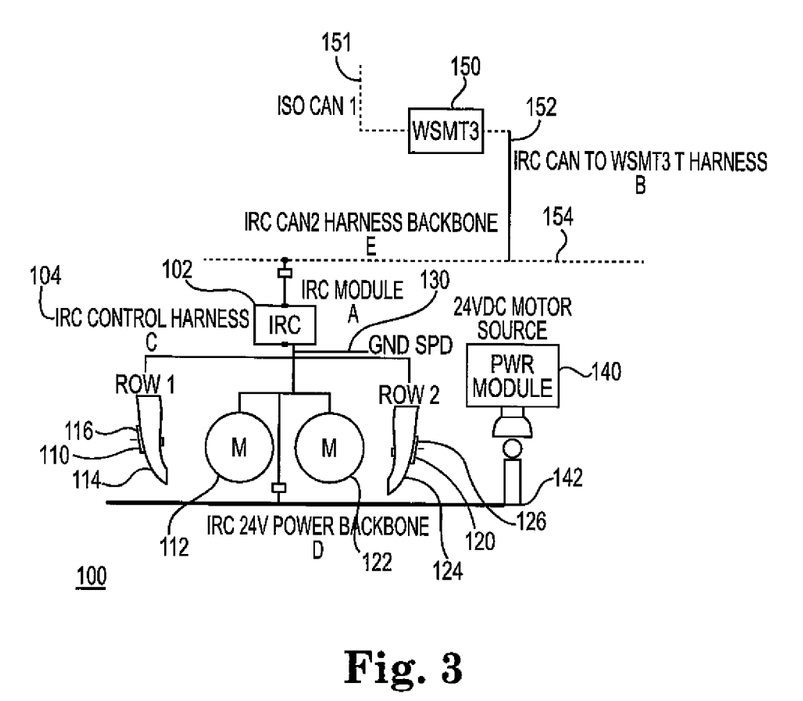
FIG. 3 depicts a schematic of a twin row planting and control system according to the teachings herein.
Figure 4:
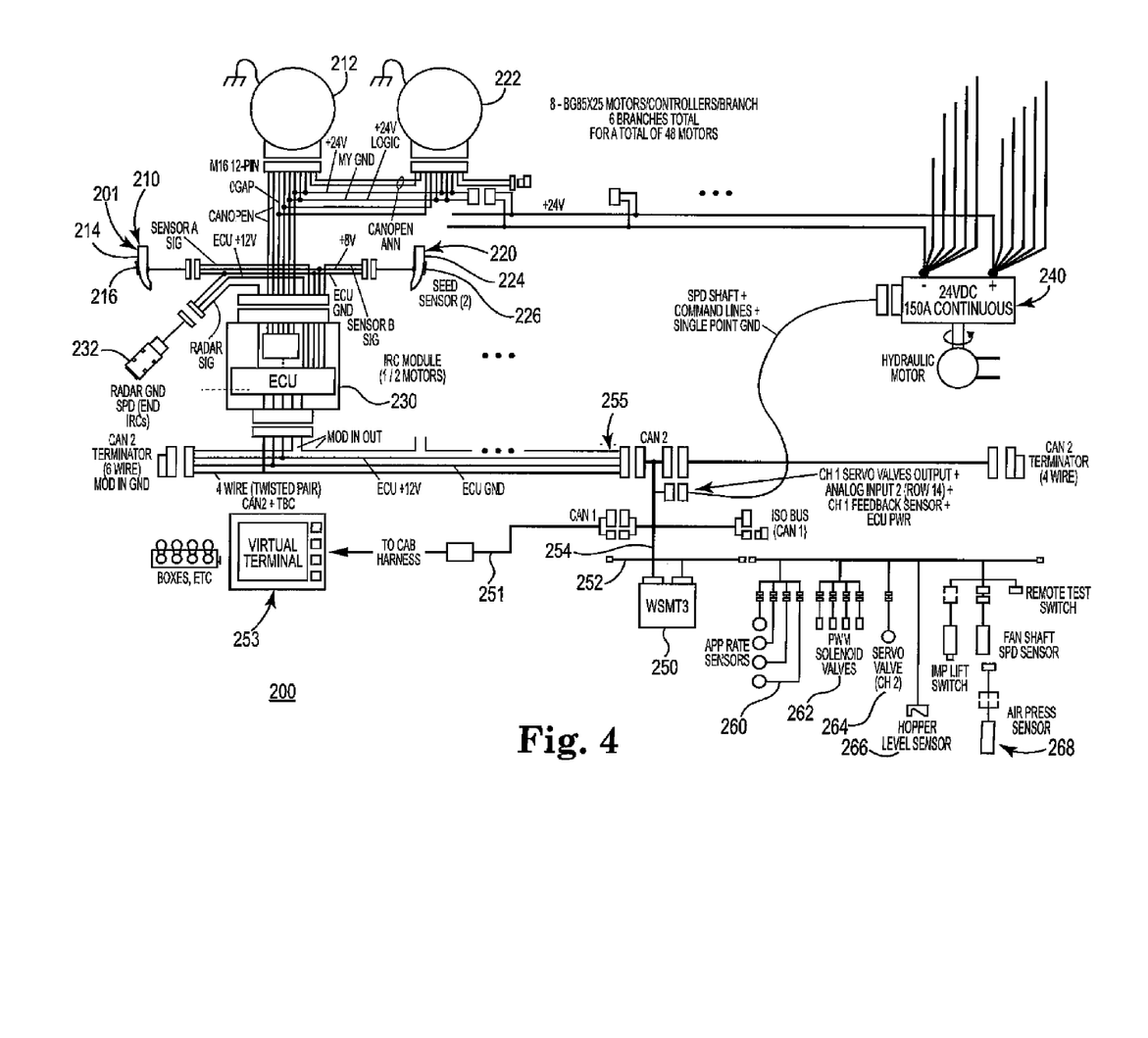
FIG. 4 depicts a schematic of a twin row planting and control system for controlling multiple twin row units according to the teachings herein.

Referring now to FIGS. 3 and 4 there are respectively illustrated a schematic of one individual row control (IRC) module assembly 100, which is one assembly of several that are coupled together on a planter boom of a planter system and an overall planter system 200 according to the teachings herein. In this example embodiment, IRC module assembly module 100 controls the speed of seed deposition of two row units 110 and 120 having seed discs using an electric motor on each disc. In this example embodiment, the two rows are comprised of a twin row configuration but these teachings are not limited and can be used in adjacent row units. In planting system 200, which uses distance stamping or tagging to control and modify seed spacing, the planter boom includes a plurality of twin row planter units such as 110 and 120 that are controlled by at least one IRC module 102 (one per one or two seeding units) each of which have motors 112 and 122 driving seeding dispensers coupled to each seed tube 114 and 124 of each row unit, each tube or chute having their own seed sensor 116 and 126. IRC module 102 is electrically and communicatively coupled to each row unit 110 and 120 by way of an IRC control harness 104. IRC module 102 is further operatively coupled to a ground distance-measuring sensor 130 as a data input providing the distance traveled of the tractor's forward movement. A 24 volt DC power module 140 is also provided to power assembly 100 by way of a power backbone line 142 that not only powers the motors but also powers the IRC module 102 (and can power a master controller as well).

In this example embodiment, the partial planting system shown in module 100 includes a master controller 150 (partially shown) that communicates to one or more IRC modules and communicates through to the row unit seed sensors, motors, and other accessories by way of a CAN BUS communication protocol. In this example embodiment, a harness 152 connects master controller 150 to an adjacent harness and row unit and also connects through a harness backbone 154 to IRC module 100. Either master controller 150 or IRC module 100 is configurable to receive a radar or GPS signal (or other positional or geo-locational device) initially as a data input to the positional deposition system of the invention. Ground distance traveled measuring sensor (such as sensor 130) and seed sensor information can also be provided to the IRC control module. In this example embodiment, a distance estimator is included in each of the IRC modules and is configured to be in sync with a ground distance-measuring sensor that is located on the planting boom arm or the planter unit. In a related embodiment, the ground distance-measuring (or ground speed in a related embodiment) estimator is in sync with the radar or GPS or positioning signal from master controller 150. In yet another related embodiment, a ground distance-measuring sensor is located on each end of the planting boom to measure the difference in ground speeds on either end when the tractor is turning or traveling on uneven ground to serve as an additional input to the IRC module or master controller.

In one example embodiment, the ground distance-measuring information is inputted into the IRC Module at a rate of one pulse per centimeter (cm) while the distance estimator is operated to be in sync with this ground distance-measuring signal and provides a pulse every millimeter (mm). Where there are two ground distance-measuring sensors the distance estimator adjusts the particular planting unit based on the actual ground distance-measured or traveled of the planting unit and based on the position of the planting or row unit relative to the two ground distance-measuring sensors (the position along the span of the planter boom that row unit is located). Each seed pulse (trigger when the seed passes an optical beam or disrupts a e-field for a microwave sensor) initiates a process of interrogating the distance estimator and recording the number of mm distance pulses since the passing or trigger by an initial reference seed. Thus, for a sample period, each seed from row A and row B (such as in a twin row configuration, see FIGS. 5A and 5B) would be distance stamped or tagged. Where you have a twin row configuration that has the planting units disposed in a For and Aft positions or location, with all seeds distance stamped, a correction for seed dispenser displacement can easily be made by applying the displacement distance as a bias to one of the rows. This puts the distance stamp or tag comparison from each dispenser in an appropriate relationship to be able to draw accurate measurements and conclusions. In one example embodiment, a series of IRC control modules are connected to a CAN communication bus that is controlled in turn by master controller or module (WSMT3—Working Set Master 3) 150.

Referring now to FIG. 4, more detail is shown regarding the planter system 200 incorporating the IRC module shown in FIG. 3. In this example embodiment, planting system 200 (partial view) comprises six branches of 8 motors each (only 212 and 222 are shown) that are powered by a 24V power source 240 and powers and communicates with an individual row controller (IRC) 201 via a CAN BUS 255, each IRC controller 201 controlling a pair of row units 210 and 220 driven by motors 212 and 222 that drive seed dispensers that dispense seeds via individual seed tubes 210 and 220. In this example embodiment, seed tubes include seed sensors 216 and 226, comprised of either optical, RF, infrared or ultrasound sensors. IRC module 201 includes an electronic control unit (ECU) 230 that can accept a pulse-frequency input from a GPS or radar function 232 or, but not limited to, a ground distance-measuring sensor. In a related embodiment, there is provided an isolated 24V supply in the IRC (individual row controller) for an Integrated CANopen controller in the motor. Planter system 200 also includes an Isolated CANopen transceiver for IRC/Motor communication interface. Finally, an overall controller system (WSMT3) 250 provides coordination between the various IRC modules and provides data and feedback via CAN Bus 251 to a virtual terminal 253 on a tractor cab. Some of the communications in this system occur as described in PCT/US2013/020464 (WO/2013/103937) and in U.S. Pat. No. 5,635,911, which are incorporated herein by reference in their entireties.

In this example embodiment, master controller 250 also communicates with and controls a series of application rate sensors 260, solenoid valves 262, at least one servo valve 264, one or more seed hopper sensors 266 and a plurality of miscellaneous switches and sensors 268.

With respect to the branches of motors powered by source 24, the programming manual for the motor/motor controller for an example motor used herein, such as the Dunkermotor (BG 65X25 CI), provides examples of increasing ramp speed of 3,000 RPM/1,000 ms. For decreasing speed, the default ramp speed is shown to be 10× faster—3,000 RPM/100 ms. These appear to be reasonable ramps for an application described herein. An example ground distance measuring sensor from DICKEY john is designed to track an acceleration ramp of <4.0 MPH/sec. In this example, the motor will be running less than 1000 RPM at a ground speed of perhaps 5 MPH. Thus, the acceleration ramp of 3 RPM/ms appears satisfactory and attainable. It would be preferable to decelerate faster hence the 10× appears to be an acceptable starting point.

Figure 5A:
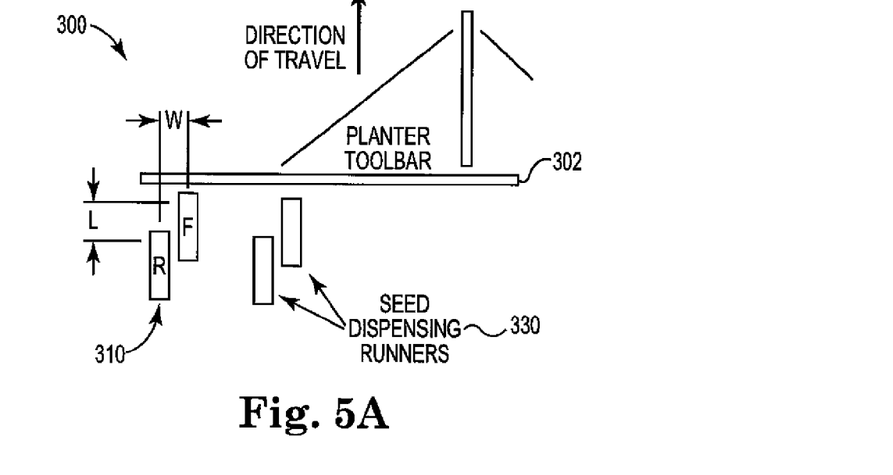
FIGS. 5A-5C illustrate a pair of twin-row seed dispensing units with a for-aft arrangement and the direction of travel along with a graph displaying data for adjusting the motor shaft of a seed dispenser motor drive according to the invention.
Figure 5B:
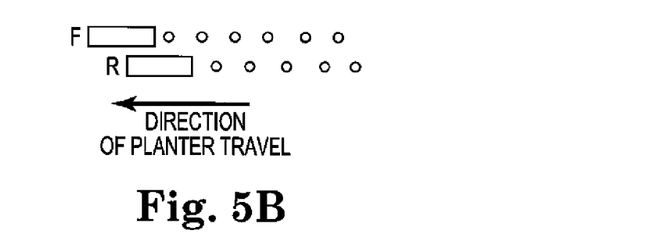
Figure 5C:
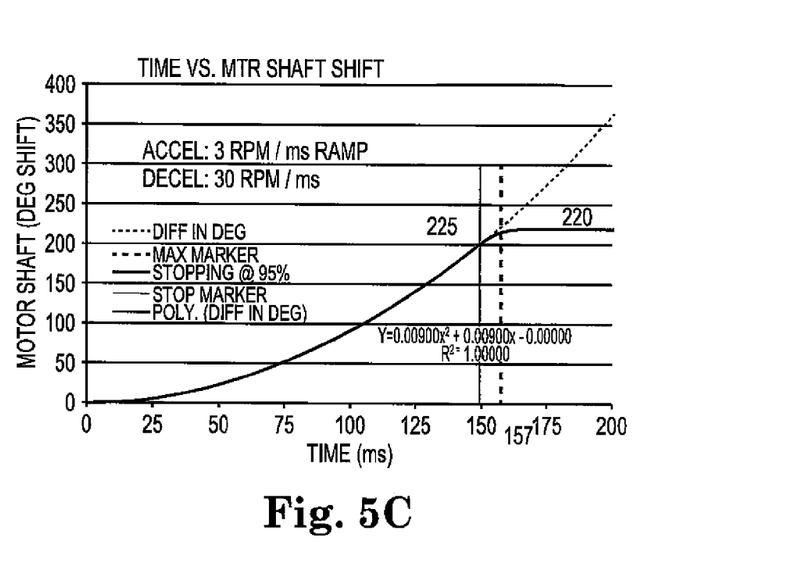

Referring now to FIGS. 5A-5C, in this example embodiment, there is provided a twin row staggering method and system configured to stagger a two (or twin or two adjacent rows) row planter unit in a twin row planter configuration 300. In particular, the staggering of two twin row seed dispensing units 310 and 330 on a planter 300 and planter boom 302 such that the resulting seed kernel spacing in the ground is such that kernels from row F (front or for) are staggered relative to those from row R (rear or aft) in such a manner to maximize the distance between seeds. The twin row (or adjacent row) concept groups row dispensing units in pairs where each pair is spaced relatively close to each other compared with the row spacing between pairs of row unit dispensers. This has certain advantages in seeds utilizing soil nutrients and sunlight. Especially when row spacing is very small, the placement of certain type of seeds in the direction of planter travel becomes an important issue to manage. Maximizing the distance between seeds (in the same row and in adjacent rows) becomes an important consideration. A pair of twin-row seed dispensing units are typically spaced row with a width W of about 7.5 inches apart. Each pair set is typically spaced further apart, about 30 inches. In the direction of travel, the row units in the twin configuration have an offset L of about 14 inches. The desired result is that the seed spacing in the ground of row R and row F are such that seeds are staggered or alternate in their position. This provides maximum separation between seeds which is a desirable condition.

For various example embodiments described herein, an electric motor drives the disc drive shaft and the speed of the seed disc is controlled by way of the motor, as illustrated in FIG. 5C. Given that an extreme example of correcting in the direction of increasing one of the two motor speeds requires a 4.5 degree shift in shaft phasing between a pair of motors, a motor phase correction of 225 degrees would be targeted with a 50:1 gear box (example, Dunkermotor SG 80) between the motor and the seed disc drive shaft. Using the 3 RPM/ms acceleration ramp, FIG. 5C illustrates the time required to make various motor shaft position corrections to achieve or maintain the desired seed spacing.

Examples of a variable speed drive capability for controlling the dispensing rate of the seeds from the dispenser are provided in U.S. Pat. No. 3,912,121 and U.S. Pat. No. 4,085,862, which are incorporated herein by reference in their entireties. Staggering two twin-row seed dispensers would typically be done on seeds similar to corn where spacing is more critical than on seeds like soybeans where the seed is "drilled" with less emphasis on kernel-to-kernel spacing. Therefore, in this example embodiment, corn is used an example seed for planting to illustrate the teachings herein.

Figure 6:
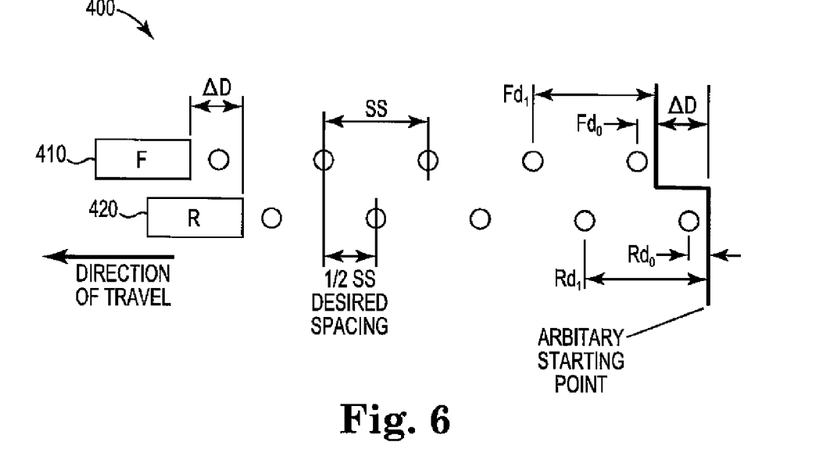
FIG. 6 illustrates a twin row planting arrangement and achieving desired seed spacing when in a staggered configuration according to the teachings herein.

Referring now to FIG. 6, in this example embodiment of a twin row configuration 400 with seed dispensing runners moving to the left, the displacement of the runners in the direction of travel is about 14 inches ($\Delta D$). Configuration 400 includes a for row unit 410 and an aft row unit 420. Since all spacing comparisons are being made in the "spatial" dimension, each seed will be tagged or stamped with a distance value from an arbitrary starting point. The arbitrary starting point can be any location where an analysis starts. To tag or stamp a seed with a distance value, the distance from the starting point must be known at all times. Ground movement can be measured from typical ground distance-measuring sensors which will put out a pulse for a given distance moved. For example, many radar ground distance-measuring sensors put out one pulse per centimeter traveled. For this example application, it would be desirable to have greater resolution than one centimeter and preferably one millimeter. In a related embodiment, where a ground distance-measuring sensor is not readily available to provide this resolution, a distance traveled estimator can be used to synchronize with a lower resolution ground distance-measuring sensor. This estimator could output a pulse every millimeter and keep in sync with the ground distance-measuring sensor that is outputting one pulse per centimeter.

In this example embodiment, every seed that is detected or interrupts a signal or wave or beam (such as interrupting an optical beam in an optical sensor or disrupting am electric field in a microwave sensor), thereby serving as a trigger, gets a ground distance stamp where the stamp is the distance of the seed from the arbitrary starting point. An adjustment can be made in one row's stamped distance values for the row displacement ($\Delta D$). After adjusting for this for-aft displacement (such as in a twin row arrangement), spatial phasing of the seeds from the two rows can be determined. Any displacement error can then be corrected by the increase in speed of the appropriate row dispenser motor for the correct spacing interval.

In one example embodiment, a corn seed disc was used from Great Plains from their Twin-Row planters all of which has 40 openings on the seed disc per revolution. With 40 seeds per revolution of the dispensing disc, there are 9 degrees of disc drive shaft rotation between seed drops. To obtain any sort of stagger relationship between two seed dispensers, the extreme case correction required is thus 4.5 degrees. Therefore, either of the two row dispensers 410 (F) or 420 (A) can be used for the correction activity since each row unit is individually controlled and the correction activity would involve a momentary increase in shaft speed of the dispenser by way of the motor rather than a decrease. In this example embodiment, the ramp speed of the disc drive shaft motor in the direction of increased seed deposition is addressed. In a related embodiment, if the seed disc were to have 60 openings, there are 6 degrees of disc drive shaft rotation between seed drops. Thus the target correction in this example would be about 3 degrees to achieve the stagger relationship. Hence the degree of shaft rotation divided by a number greater than one, such as 2, (or multiplied by 0.5) would provide the proper phase difference between the seed discs of adjacent rows for proper staggered spacing in these examples. Therefore by synchronizing the angular positions of the two seed dispensing discs in the selected two rows there would provide the proper phase difference between the seed discs of adjacent rows for proper staggered spacing.

In this example embodiment, phase adjustments are planned in segments or sample sizes of 200 seeds (for each seed dispenser, hence a sample size for each of the for 410 and aft/rear 420 row units). When 200 seeds (a first sample size) have been dispensed from the seed dispenser of first row unit 410 (F) and 200 seeds (a second sample size) from the seed dispenser of second row unit 420 (R/rear), an analysis is performed to determine what phase shift correction is needed to provide optimum singulation when the seed sample sizes from each of dispensers 410 and 420 are combined into a third sample size. "Singulation" will be the parameter that will be optimized by suitable spatial bias adjustment on one of the seed dispensers. The IRC module knows the instantaneous ground distance traveled of the planter for each seed dispensed. Thus, each seed is "distance stamped or tagged" against some starting reference location or event.

Thus, at analysis time in this example embodiment, once the IRC module has collected data on 400 distance stamped seeds, 200 from each dispenser. Distance spaced on one of the rows can be pre-bias based on the for-aft distance of the two dispensers. Thus, when combined, the 400 seeds (a third or another sample size) simulate or are viewed as one row unit with nominal seed spacing one half of the spacing associated with each row dispenser. Hence the exercise of seed spacing conceptually becomes one of achieving seed spacing for one row. The concept of seed singulation also is an important factor or parameter in our invention as it assists in the achieving the proper phase adjustments to reach the desired spacing configuration. The definition of "singulation" is an extension of ISO-7256-1 and is used in calculating the percent singulation of the combined rows (or twin or two adjacent rows). An iterative approach (or some other mathematical approach) can be used to find the spatial bias that must be added to seeds from dispenser 420 to provide the maximum percent singulation. The maximum singulation is the goal in making this phase adjustment.

Once the optimum bias is determined for maximum percent singulation, it is applied to the seed dispenser of either row unit 410 or row unit 420 and the next sampling begins. In applying the bias, the seed dispenser that is appropriate to "speed up" momentarily is adjusted. Thus, if the bias on unit 420 is positive, seed dispenser row unit 420 must be moved forward to get into optimum phase. If the bias on row unit 420 is negative, the seed dispenser of row unit 410 must be moved forward. Correction is always made by momentarily speeding up one of the seed dispensers and preferably not by slowing one down.

Thus, when the two spatial seed patterns (position of at least two individual seed kernels in the soil) are compared and the correction factor determined the row providing the least correction (correction by increasing motor speed of seed dispenser) is submitted to an increase in speed per the ramp programmed into a motor controller. The actual target speed for such an increase could be arbitrarily set to ×2 normal operating speed. The timing is based on the ramp factor and meeting or even approximating the target speed meets the needs of the invention. Where the target speed for the motor on the seed dispenser is met, it will cause a more conservative adjustment step.

In another example, it would take about 157 ms to change the two motor shafts relative phase position by 225 degrees. This time would only increase the motor speed of the motor being operated upon by about 471 RPM. With a typical motor speed of 1000 to 2000 RPM, this would increase the normal operating motor speed by a reasonable margin (less than double) for the last fraction of the 157 ms. The return to normal speed would happen prior to the 157 ms since there is a deceleration factor involved that must be accounted for in returning to the normal operating speed. Also, it would be more precise not to over-shoot but rather approximate the ideal running condition. The graph of FIG. 5C illustrates a 95% switch point (95% of calculation time of 157 ms) where the motor speed would start its returned to its normal speed. Overall, it caused a phase correction of 220 degrees which is approaching the 225 degrees desired or targeted.

EXAMPLE

Suppose a 1" shift correction is needed in phase where the nominal seed spacing is 6.3".

(1/6.3)*9 deg shaft*50 gearbox ratio=71.4 deg motor rotor shift

Using the trend line in FIG. 5C, 71.4 deg mtr shift (motor shift) requires 88.5 ms Adjust the motor that will require the least amount of adjustment when speed is increased Ramp to higher speed for 95% of 88.5 ms=84.0 ms at which time return to normal speed The ramp function in the motor controller is used to adjust the seed dispenser phase. When not in a correction process, the two motors driving dispenser units 410 and 420 are running at the same speed. If dispenser 410 or F needs to be moved forward to get into the correct sync with 420 or R, a higher speed command is given to 410. In this example embodiment, the actual end set point speed is not important because the ramp-up timing is used to bring the motor up in speed to match the phase needed for proper synchronization. The duration required in applying the higher speed command to motor of unit 410 is a calculated value based on the ramp slope. Shortly before the seed dispenser reaches the optimum phase relationship, the speed command is returned to normal. Thus, the correction calculated from the current 400 seeds is applied to the next 400 seeds. It is anticipated that the loop will very quickly close in on the correct phase relationship and wander slightly around the optimum phase relationship.

Figure 7:
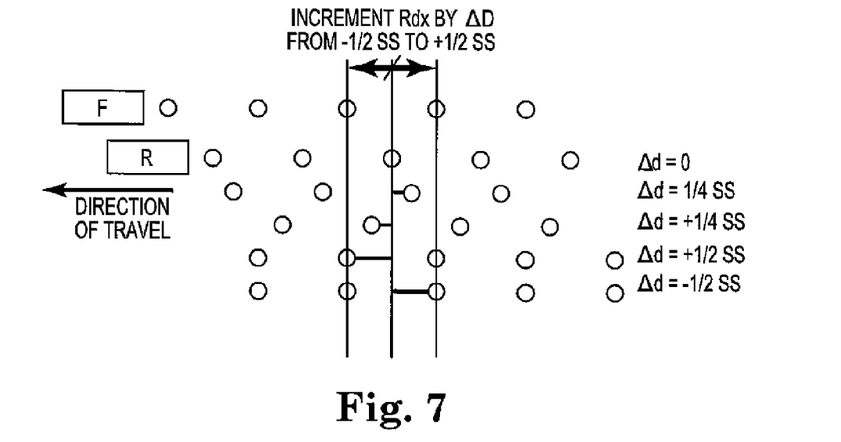
FIG. 7 illustrates a twin row planting arrangement and achieving desired seed spacing when in a staggered configuration according to the teachings herein.

For a general discussion on spacing corrections, referring to FIG. 7, it would be desirable to correct spacing based on a predetermined sample size or number of seed kernels as opposed to only one or two kernels. Given that an individual row dispenser will not have perfect seed spacing among its own hopper of seeds, it would be beneficial to average some seed location information between two rows to determine the optimum correction. A Δd (distance delta or difference) value is added to each R seed (seeds from the rear or aft row seed dispenser R) in the study and the sum of square errors are calculated based on the difference (with respect to distance) between each R seed and its closest neighbor F seed (seeds from the for seed dispenser F). The Δd value is incremented from −½ nominal seed spacing to +½ nominal seed spacing in small increments relative to the nominal seed spacing. The Δd value of interest is that value that gives the lowest sum of square errors or the maximum singulation when combining both rows. Call this Δdfinal. This Δdfinal value provides the difference in phase shift between F and R. Ideally, this value should be equal to ½ the nominal seed spacing (+/−) as that would stagger the seeds in the best possible manner. FIG. 7 illustrates an example where the seeds from seed dispenser R are perfectly staggered to be between the seeds from dispenser F. Seed positioning for dispenser R are also shown after various Δd's are applied. In this case +½ Nom and −½ Nom would provide the lowest error and Δdfinal would be either +/−½. Nom spacing.

A Δd bias value is added to each R seed in the study and the % Singulation calculated for the combined seeds from F and R. The Δd value is incremented between −½ NSS to +½ NSS to determine the value required for maximum % Singulation.

If the optimum Δdfinal value (that giving the lowest error or maximum singulation) is positive, row unit R needs to be sped up momentarily. Similarly, if the optimum Δdfinal value is negative, row unit F needs a momentary boost. The difference in stagger from ideal shall be used to determine the distance traveled (or time duration in another example embodiment) duration of the correction as explained above. It is recognized that other algorithms can be utilized to determine the stagger relationship between seeds of dispenser F and those of dispenser R. This is a different and is a more direct approach in comparing seed location in the ground than that taught in the prior art.

Figure 8:
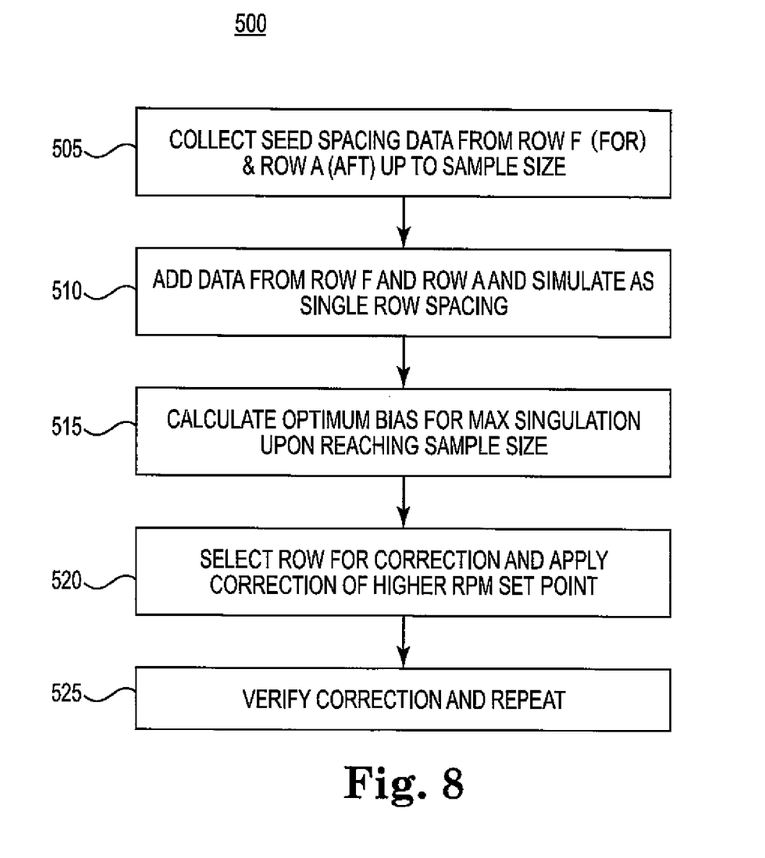
FIG. 8 illustrates a flowchart of a method depositing seeds in a twin row or multiple row configurations.

Referring to FIG. 8, there is illustrated a flowchart 500 that describes the steps of a method of depositing seeds in a furrow from a twin row or close two row configuration. One example embodiment of the method includes the following sequence of steps for performing this correction approach: in step 505 seeds spacing data in the form of a distance stamp for each seed is collected for each of row F (for) and A (rear/aft) up to a defined sample size. In one example, the sample size starts at 200 seeds per row unit of seed spacing collection data. In step 510, the data from each row unit is added together to generate a new sample size and this new sample size is treated or used as a single row spacing exercise or calculation. Hence in this example, 400 seed spacings have been collected (row F and row A), and then the new sample size is used in step 515 to calculate the optimum bias for max seed singulation (or other arithmetic or mathematical evaluation method). In step 520, a row unit seed dispenser is selected for correction and the correction is applied, which in this case is applying a higher RPM set point for ΔT (by sending a signal from an individual row controller or the master controller to temporarily speed up the selected row unit). At step 525, after correction has been made and verified the process is repeated and once again two sample sizes are collected and spacing is calculated and calibrated again. In a related embodiment, the ground measuring sensors located at each end of a planter boom provide useful data to maintain proper seed spacing among the various row units along the planter boom.

A Visual Basic code block (modified) that calculates singulation is shown below and reflects the operation of flowchart 500. This calculation is based on some of the calculations in ISO 7256-1 standard.

```
'Initialize all holding registers
a = 0
b = 0
c = 0
d = 0
e = 0
f = 0
g = 0
NSS=XXXX (nominal seed spacing for 400 seeds)
For each Seed Spacing (400 total)
'Get seed spacing
ss = Seedn+1 Distance Stamp - Seedn Distance Stamp
'Bin ss
If ss < (0.5 * NSS) Then
        a = a + 1
    Else
        If ss < (1.5 * NSS) Then
            b = b + 1
        Else
            If ss < (2.5 * NSS) Then
                c = c + 1
```

```
        Else
            If ss < (3.5 * NSS) Then
                d = d + 1
            Else
                If ss < (4.5 * NSS) Then
                    e = e + 1
                Else
                    If ss < (5.5 * NSS) Then
                        f = f + 1
                    Else
                        g = g + 1
                    End If
                End If
            End If
        End If
    End If
    Next Seed Spacing
    n = a + b + c + d + e + f + g
    np = b + 2 * c + 3 * d + 4 * e + 5 * f + 6 * g
    sing = 100 * (n - 2 * a) /np
```

An iterative approach was used initially in determining the bias on R that would provide the maximum singulation for the combined rows. Bias was iterated from −NSS/2 to +NSS/2 (NSS being Nominal Seed Spacing for one of the rows). The following shows an example of iterating on the first 400 seeds and applying the bias that provided the highest singulation to the second set of 400 seeds. The second set was a lot closer to being ideal after having the initial bias correction applied.

The resolution required for the bias values need not be extremely precise. For this example where the NSS was 4.4 inches, it was decided that 0.05 inch was more than needed, while 0.1 inch would suffice. In addition, an algorithm could be utilized here for finding the peak value more quickly than interating across the entire seed spacing range. Various techniques are available to allow efficient choices of bias values to try in finding the peak singulation value. For example, as seen in the above example, after the initial correction is made, subsequent bias corrections are likely to be near "0". Thus, the iterative process might start at "0" and expand below and above this value until a peak is noted.

The inventive example embodiments described herein do not use an "index" mark or a "reference" signal generated by a master controller, a seed sensor or any other seed parameter generating sensor. Actual seed sensor 'triggers" in the chute or tube are used to generate a distance stamp by interrogating the distance estimator. Hence actual ground distance information from each seed is used to map the seed placement in the ground. It does this for two rows and compares the placement of the seeds relative to the two rows of interest. It then adjusts the motor speed of one of the seed dispensers to provide the desired objective of staggering or spacing the seeds in an optimum pattern to provide maximum distance between seeds. It does not favor adjustment of a row relative to a reference signal or a permanent reference point. Whichever row lends itself to the more expedient correction while not slowing down the application rate is used.

The following patents that relate to deflector devices are herein incorporated by reference in their entirety and constitute part of the disclosure herein: U.S. Pat. Nos. 3,912,121; 4,085,862; 4,225,930 and 5,635,911 and PCT/US2013/020464 (WO/2013/103937).

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present invention to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

We claim:

1. A seed dispensing system comprising:
at least a first and a second row unit adapted to dispense seeds and arranged in a staggered configuration, each row unit including:
a seed dispensing device adapted to provide a dispensing action for a plurality of seeds;
a drive assembly configured to drive the seed dispensing device;
a sensor adapted to sense at least the passage of a seed and generate a signal corresponding to the seed passage; and
an individual row controller operably coupled to the drive assembly of each row unit and configured to receive the sensor signals and assign distance tags for each seed related to a seed position in a furrow beneath each of the first and second row units, the individual row controller further configured to store sensor signals from each row unit until a first row unit sample size and a second row unit sample size is reached; wherein the controller is configured to combine the first and second sample size to generate a third sample size that simulates a single row seed spacing configuration and to determine whether the seed spacing is at a desired level or optimized.

2. The seed dispensing system according to claim 1, wherein the row controller is configured to alter the dispensing action of the seed dispensing device of the first or second row unit to establish the desired or optimum seed spacing in terms of singulation of the seed.

3. The seed dispensing system according to claim 1 further comprises multiple pairs of row units that are in a staggered configuration, wherein each pair of row units includes a dedicated row controller configured to control the seed dispensing independent of an adjacent single or pair of row units.

4. The seed dispensing system according to claim 3 further comprising a master controller configured to communicate with the individual row controllers and monitor seed spacing along a planter boom having a plurality of row units mounted thereon.

5. The seed dispensing system according to claim 2 wherein the drive assembly further includes a motor adapted to be responsive to the row controller.

6. The seed dispensing system according to claim 2 further comprising a seed delivery device adapted to receive the seed from the seed dispensing device and deliver a seed to a furrow formed in soil beneath the row unit and wherein the seed sensor is located on the seed delivery device.

7. The seed dispensing system according to claim 1 further comprising a ground distance-measuring sensor operatively coupled to the row controller and adapted to provide an input to the row controller in determining whether the seed spacing is optimum or is at the desired level.

8. The seed dispensing system according to claim 1 wherein the controller is reconfigurable for seed spacing as a function of the number of seeds per revolution of a dispensing disc and the number of degrees of a disc drive shaft rotation to arrive at a number of degree drive shaft rotation between seed drops of two seed dispensers.

9. The seed dispensing system according to claim 8 wherein the controller achieves a desired staggered seed spacing configuration between the first and second row unit by synchronizing the angular positions of the two seed dispensing discs in the two rows.

10. A method of depositing seeds with a planter system having multiple row units with each row unit having a seed dispensing device, the method comprising the steps of:
   operating the multiple row units such that seeds are dispensed from the seed dispensing device;
   sensing a seed passage for at least a first row unit and a second row unit and generating a seed signal for each sensed seed of each row unit;
   assigning distance tags for each seed signal which relate to a seed position in a furrow beneath each of the first and second row units;
   storing seed sensor signals from each row unit until a first row unit sample size and a second row unit sample size is reached;
   combining the first and second sample size to generate a third sample size that simulates a single row seed spacing configuration; and
   determining whether the seed spacing is optimized.

11. The method of depositing seeds according to claim 10 further comprising altering the dispensing action of the seed dispensing device of the first or second row unit to establish the desired or optimum seed spacing in terms of singulation of the seed.

12. The method of depositing seeds according to claim 11 wherein the step of altering the dispensing action of the seed dispensing device of one or more row units includes increasing the speed of a seed dispensing drive assembly for a given time period to achieve the desired synchronization.

13. The method of depositing seeds according to claim 10 further comprising the step of reconfiguring the seed spacing as a function of a number of seeds per revolution of a dispensing disc and a number of degrees of a disc drive shaft rotation to arrive at a number of degree drive shaft rotation between seed drops of the two seed dispensers.

14. The method of depositing seeds according to claim 13 further comprising the step of achieving a desired staggered seed spacing configuration between the first and second row unit by synchronizing the angular positions of the two seed dispensing discs in the two rows.

15. The method of depositing seeds according to claim 13 further comprising the step of providing a ground distance-measuring sensor input signal so as to establish the optimum seed spacing.

16. A seed planting system comprising:
   a plurality of row units adapted to dispense seeds, each row unit including:
   a seed dispensing device adapted to provide a dispensing action for a plurality of seeds;
   a drive assembly configured to drive the seed dispensing device;
   a sensor adapted to sense at least the passage of a seed and generate a signal corresponding to the seed passage; and
   a row controller adapted to control two adjacent row units of the plurality of row units and configured to communicate with the drive assembly of each the adjacent row units, the controller further configured to receive the seed sensor signals from each row unit and assign distance tags for each seed related to a seed position in a furrow beneath each row unit, the controller further configured to store seed sensor signals from each row unit until a row unit sample size for each row unit is reached; wherein the controller is configured to combine the sample sizes of two adjacent row units to generate another sample size that simulates a single row seed spacing configuration and to determine whether the seed spacing is optimum.

17. The system as defined by claim 16 wherein the row controller is configured to alter the dispensing action of the seed dispensing device of either of two adjacent row units of the plurality of row units to establish the optimum seed spacing in terms of singulation of the seed.

18. The system as defined by claim 16 wherein the row controller is reconfigurable for seed spacing as a function of the number of seeds per revolution of a dispensing disc and the number of degrees of a disc drive shaft rotation to arrive at a number of degree drive shaft rotation between seed drops of the two seed dispensers or row units.

19. The system as defined by claim 18 wherein the controller achieves a desired staggered seed spacing configuration between the two adjacent row units by synchronizing the angular positions of the two seed dispensing discs in the two rows.

20. The system as defined by claim 18 further comprising a master controller communicatively coupled at least one row controller and a ground distance-measuring sensor operatively coupled to the row controller and adapted to provide an input to the row controller in determining whether the seed spacing is optimum.

* * * * *